Feb. 24, 1948.  A. H. DE MOSS  2,436,714
PROGRAM CONTROLLER
Filed Aug. 29, 1942  2 Sheets-Sheet 1

INVENTOR.
BY ALBERT H. DE MOSS
Bruno C. Lechler
ATTORNEY

Feb. 24, 1948. A. H. DE MOSS 2,436,714
PROGRAM CONTROLLER
Filed Aug. 29, 1942  2 Sheets-Sheet 2

INVENTOR.
ALBERT H. DeMOSS
BY Bruno C. Leichler
ATTORNEY

Patented Feb. 24, 1948

2,436,714

UNITED STATES PATENT OFFICE 2,436,714

PROGRAM CONTROLLER

Albert H. De Moss, Moline, Ill., assignor to American Machine and Metals, Inc., New York, N. Y., a corporation of Delaware Application August 29, 1942, Serial No. 456,589

15 Claims. (Cl. 200—87)

This invention relates to an improved program controller. More particularly the invention relates to that type of program controller which is moved step by step, and at each step causes certain operations, such as the opening and closing of valves, to be performed.

Such program controllers frequently are used to control a process, involving opening and closing valves at the right time, filling containers to a specified depth at the right time, and controlling temperature, admixture of ingredients, dumping of some of the contents and operation of a driving motor.

Frequently the process consists of a number of grouped steps, some of which groups of steps are repeated, before proceeding to another type of grouped steps. The invention relates to the type of program controller in which the operations are accomplished directly by the controls, as by cams on its surface moving levers or cables connected to a valve, as well as to types where the operation is performed by an electric current or air circuit closed by the program controller at certain steps.

More specifically the invention relates to a program controller adapted to control a process some portions of which may have to be repeated at times.

It is adapted to carry a process through some complete intermediate operation, repeat that operation one or more times as desired, then to carry the process to other steps, permitting repetition, if desired, of those steps also, but not permitting return to an earlier step after work on latter steps has been begun.

Thus, by way of illustration, in a commercial washing means there are certain functions to be accomplished; opening of hot water and cold water valves; shutting these when a selected level is reached; moving the washer now one way, now in reverse, adding soap or alkali, and opening the dump valve.

These steps, in their proper sequence form a group of steps designed to give the work being treated a suds treatment. Some of these steps may be combined to form a rinse treatment and the controller, applied to this use will permit performing one wash treatment followed by one rinse treatment, or it will permit repeating the wash treatment one or more times before proceeding to the rinse treatment, but once a rinse treatment has been entered on, it will prevent returning to that part of the controller that governs the suds treatment.

Such repetition of groups of steps providing some intermediate part of a complete treatment, in the past were often accomplished by using a large drum, or record-playing-like disk, or player-piano-like strip, on which the entire group of steps was repeated again and again.

That makes a very long record and besides, if we wish to have less than the full number of grouped steps, we must jump a portion of the record corresponding to the unwanted repetitions.

It is the object of the invention to provide a controller having only one set of grouped steps for each function to be performed and to provide means to turn the controller backward to the beginning of that group of steps as often as desired before passing on to the next group of steps.

It is a further object of the invention to provide an electrical controller having only one group of steps, each step closing certain circuits, the sum of the group of steps providing for the automatic control of one stage of a process, such as treating a load of clothes with warm water and detergents for a fixed time, then dumping the water out, and in connection with such a group of steps, means to repeat this group of steps as often as desired.

It is a further object of the invention to move the controller forward step by step by one device with another device adapted to return the controller to a particular earlier step which is at the beginning of the particular group of steps in which the controller happens to be.

It is a further object of the invention to provide a controller with means to move it forward step by step, through a series of grouped steps against a spring tending to carry the controller backward, and release for a holding pawl, allowing the spring to carry the controller back to the beginning of that particular group of steps.

It is a further object of the invention to provide a drum controller adapted to control a complete operation consisting of several different, successive grouped steps, with means to move the controller forward step by step against a spring; means releasing the spring to carry the controller back to the beginning of that group of steps, and a master release, effective on the completion of all the varied steps entering into a complete operation, to allow the spring to carry the controller back to the starting point through all the group of steps.

It is a further object of the invention to provide means for making the selective repetitive circuit control element inoperative when desired and letting the circuit closing device return to its initial position.

It is a further object of the invention to provide a program controller which can supply any desired program by the repetition of one or more groups of grouped steps by moving the program controller back over a part of its travel.

The invention is not limited to a particular industrial field, but one illustrative field relates to the automatic control of industrial washers. In the operation of such a washer it is necessary to control during properly related time intervals the admission of hot water, cold water, soap, alkali, steam, temperature, agitation, bluing, sour, and the dump valve has to be opened and closed. Certain levels of liquid which vary at various stages of the process, have to be maintained. Program devices of various types have been applied to this field but they involved an unwieldy lot of circuits, a multiplicity of duplicate connections for the repetition of certain groups of steps, while my device is provided only with means for stepping it forward through one group of each set of related steps, with means for carrying the program controller back to the position which corresponds to the initiation of that portion of the washing process which is to be repeated.

Since the washing process has different stages such as washing and rinsing, provision is made that if the washer has once passed on to a particular stage, such for example, as rinsing, it will repeat that portion of the group of successive contacts which control the appropriate step, in this case a rinsing, not a washing operation. However, if the device has passed beyond washing into the range of contacts that control the rinsing stage, then upon release, the controller will repeat only that portion of its travel which corresponds to rinsing.

Finally, provided the initiation for the return is made at a stage of the process where the full cycle of treatment is necessarily complete, provision is made to permit the return of the controller through all the intermediate stages that control the several operations, to its initial position.

Figure 1:
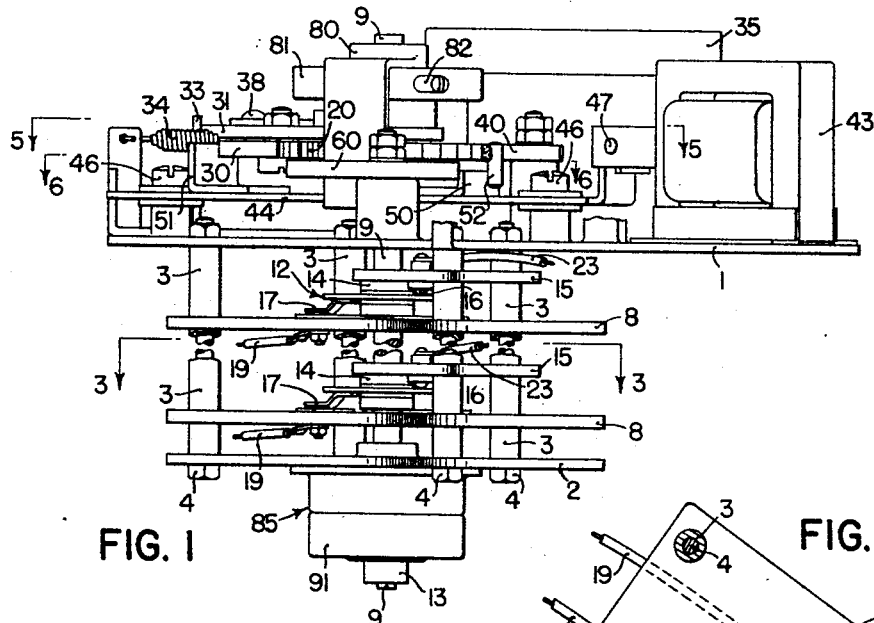
Figure 1 shows an elevation of the program controller.
Figure 3:
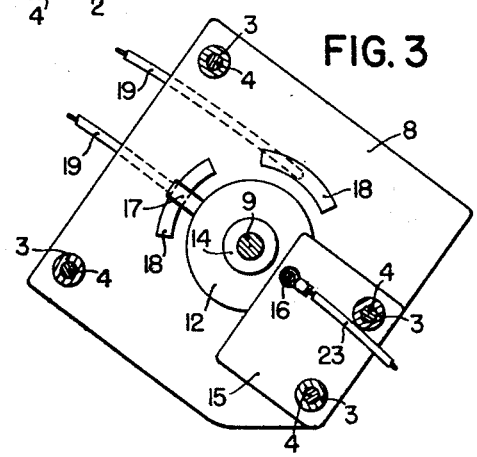
Figure 3 is a section along lines 3—3 of Figure 1, showing the arrangement of the contacts in one contact bank.

The controller comprises a frame consisting of spaced plates 1, 8, 15, 2.

Revolving within this frame is a shaft 9 that carries a number of contact fingers 17 that complete various circuits through contacts 18 carried on plates 8 of the frame. From each contact runs a lead 19. Each lead runs to the apparatus controlling a particular function, such as the admission of water, the selection of temperature of the admitted water, the opening of the dump valve, or some relay on motor controlling a switch or other function to be controlled.

Figure 5:
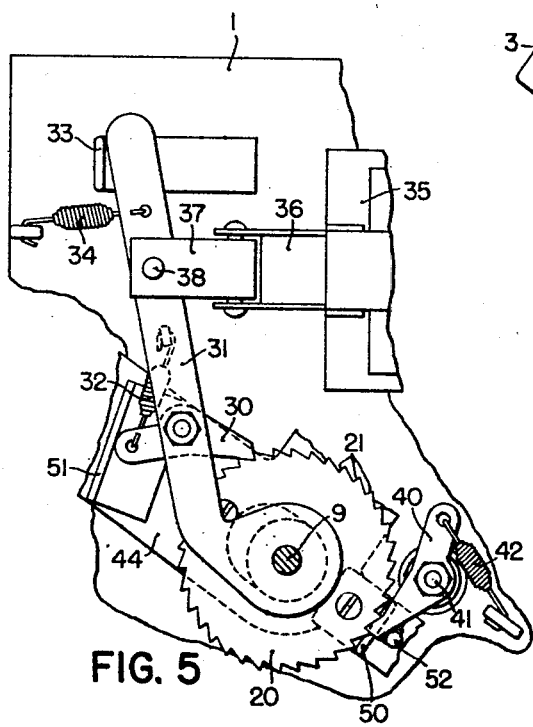
Figure 5 is a section along line 5—5 in Figure 1.

Mechanism, generally shown in Figure 5, is provided to move the shaft in a clockwise direction step by step, each step equal to one tooth on ratchet wheel 20 that is keyed to shaft 9.

Means are provided for turning shaft 9 backwards through part of the distance it has moved, including a coil spring 90, one end of which is stationary, the other end attached to the shaft 9, and means for lifting the pawl 40 from ratchet wheel 20 to set the spring free to turn backward. These means include a solenoid 43 and a sliding plate 44, Figure 4, and the pawl and disk shown in Figure 6.

Finally, at the completion of one revolution of the shaft 9 other means including finger 80 and pin 82 permit the spring 90 to carry shaft 9 back through the entire distance it has moved.

The frame consists of main base plate 1 on which a number of intermediate plates 8 and 15 and end plate 2 are supported. These are supported on bolts 4 and held apart by spacers 3. This frame supports the element revolving forward and backward.

The revolving element that makes the contacts is carried on a shaft 9 that is supported in a bearing on the end plate 2 and in a bearing 10 carried by plate 1. This shaft carries a series of contact disks 12 supported by and insulated from shaft 9 by collars 14 which are fixed to shaft 9. These contact disks cooperate with spring contacts 16 which are supported by plates 15, and from which current is supplied to the contact disk. Each disk 12 carries a contact finger 17 which slides over contact segments 18 arranged in a circle on one of the plates 8 when the shaft 9 together with disks 12 and fingers 17 is rotated. From the several contacts 16 and 18 on the frame leads 19 and 23 lead off. There may be any number of lead wires 23 depending on the number of banks of contacts and as many contacts 18 as may be required by a particular program circuit in each bank.

Means are provided, such as shown in Figure 5, to move the shaft 9 in a clockwise direction as seen in drawings 3, 4, 5, 6, stepwise by a ratchet mechanism. A ratchet wheel 20 is keyed to shaft 9. This wheel has one tooth 21 for each desired set of electrical connections and in the example here shown there are 32 such teeth corresponding to 32 steps in the controller. Each step sets up one set of electrical connections. This ratchet wheel 20 is adapted to be moved forward by a pawl 30 which is pivotally fixed to lever 31 which in turn rides loosely on shaft 9. Pawl 30 is drawn against the ratchet wheel by a light spring 32 fastened at one end to the pawl and at the other to lever 31. The lever 31 is normally drawn against a stop 33 on the frame by a spring 34 attached to the end plate 1. A solenoid 35 supported by the frame is periodically energized and has a movable core 36 connected by a link 37 with lever 31 at 38. The periodic energizing of the solenoid may be determined by some operation of the process itself or it may be controlled by a timing device.

Figures 2, 4:
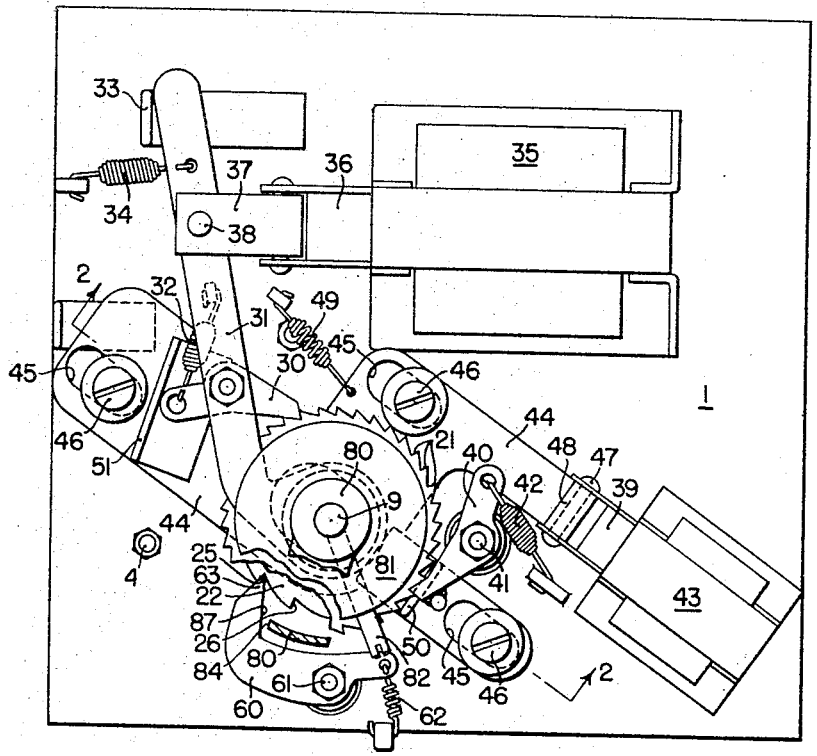
Figure 2 is a central section through the program controller, along line 2—2 of Figure 4.
Figure 4 is a top view showing the driving mechanism, some parts broken away.

It will be seen that the energization of solenoid 35 causes the lever 31 to be drawn away from stop 33 and that the ratchet wheel 20 is moved in a clockwise direction as shown in Figures 4 and 5 one step. A pawl 40 supported on end plate 1 by a stud 41 and drawn against ratchet wheel 20 by a light spring 42 which also is anchored at one end on plate 1 prevents the ratchet wheel 20 from returning once it has been moved forward.

The means for turning the shaft 9 backwards include a housing 85 attached to end plate 2. In section 91 of this housing is the stationary anchorage of a spring 90, the inner end of the spring being fixed to 11, an extension of shaft 9. In the upper part of this housing is a speed-checking device, such as a shaft collar 83 having a dependent flange 86 carrying vanes 89 that revolve with the shaft 9 in an oil pool contained in 85.

The collar 13 is fixed to the end of shaft 11 outside the housing to prevent longitudinal movement of the shaft 11.

Though spring 90 seeks to turn the shaft 9 backward, this can only happen when pawls 30 and 40 are disengaged from the ratchet wheel 20.

In the form here shown this is done by moving a sliding plate 44 from upper left to lower right in Figure 4. This plate is guided by three studs 46 in plate 1 that pass through slots 45 in plate 44 and this plate carries an angle 51 and another angle 50. When the plate is moved in the manner indicated angle 51 catches the back of pawl 30 and angle 50 carries a pin 52 which is attached to pawl 40. Thus it will be seen that by moving plate 44 against the spring 49 which is anchored on plate 1 that normally holds it in the position shown the shaft will be allowed to go back in response to coiled spring 90. In the form here shown a solenoid 43, carried by the frame, draws in its armature 39 which is connected by pin 47 with the upwardly extending ear 48 of plate 44.

The means by which the spring is permitted to turn shaft 9 back through only a part of a circumference, to a particular point, will now be described. On shaft 9 directly below the ratchet wheel 20 to which it is attached, is a disk 22 best shown by Figure 6, having notches at spaced points and a third pawl 60 that is pivoted on the frame 1 at 61. This is not released by sliding plate 44. This pawl is drawn into contact with disk 22 by a spring 62 anchored to plate 1.

In a controller having 32 steps, the the first few steps may control the starting of pumps and other equipment preparatory to the main operation, and may control the holding circuit that keeps the switch or that keeps the controller running. Thus, disk 22 may have a starting notch 25 corresponding to one of the ratchet teeth, and a notch 26 corresponding to some other notch of the ratchet wheel and if the controller has been moved to some position where point 63 of pawl 60 lies between tooth 26 and another tooth 27, it will be seen that as spring 90 moves shaft 9 counterclockwise the pawl 60 will engage notch 26 and prevent the controller mounted on shaft 9 from going back further.

Figure 6:
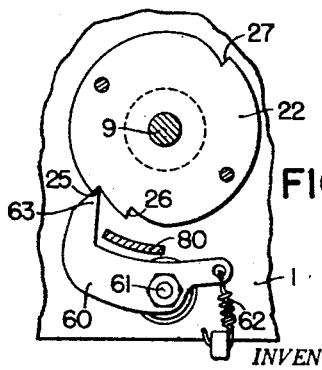
Figure 6 is a fragmentary section along line 6—6 of Figure 1 with sliding plate 44 removed for greater clarity.

As shown in Figure 6 there may be other notches on disk 22; and each may mark the beginning of some other group of steps. Thus the notches on ratchet wheel 20 that correspond to the washing steps may fall between notches 26 and 27 and those that fall beyond between 27 and 25 may correspond to rinsing.

In that event, if disk 22 in Figure 6 has moved on to a point just before 27 reaches pawl 60 the disk will turn back until ratchet 26 is engaged if plate 44 is moved, which means repetition of the suds cycle; but if the disk 22 has turned far enough to carry tooth 27 past the pawl 60, thereafter actuating plate 44 in the same manner, the shaft will return only to bring notch 27 into contact with the pawl.

The mechanism described indicates how it is possible to repeat the steps between certain notches on disk 22 any number of times before proceeding on to the next steps. But it does not provide any means for completely unwinding the spring and carrying the contact 17 back to the starting point.

Additional means are therefore provided for carrying the program controller back to the starting point, means effective only when the controller has made one complete program, that is, has completed one complete circuit. These means comprise a pin 82 which is set in the collar 81 and turns with the shaft 9. This pin is so placed angularly that when the controller has about made one complete revolution it strikes a dependent finger 80 which is riding loosely on the upper end of shaft 9 and extends downwardly in Figure 1 to the level of pawl 60. Therefore, when shaft 9 has about made one complete revolution the pin 80 which it carries pushes against one side of finger 80, pushing it on around against the back surface 87 of point 63 of pawl 60, thus lifting the pawl out of action.

No immediate results follow for the position of shaft 9 is determined by the forward movement of ratchet wheel 20 by the lever 31 and the restraining of the return pawl 40.

After the pawl 60 has been thrown out of action in the manner described, the next time the release solenoid 43 functions, lifting pawls 30 and 40 out of contact with the ratchet wheel as described, the spring 90 uncoils carrying shaft 9 completely back to the starting point. When the spring 90 carries the shaft 9 back, finger 80 remains under the tip of pawl 60 holding it out of engagement. But in turning back the pin 82 swings completely around with shaft 9 and strikes the other side, 84, of finger 80 pushing the finger away from under pawl 60 and allowing pawl 60 to again function. This release of pawl 60 takes place after notch 26 has passed point 63 but before notch 25 has come to the point 63. The pawl 60 will therefore be released in time to engage notch 25, assuring that at the start of each operation the controller is always registered at the initial point which corresponds to notch 25. This places the parts in readiness for the commencement of the next cycle.

To prevent injury to the apparatus by the impact of the rapidly turning movement of shaft 9 caused by the uncoiling spring 90, a dash pot of any desired type may be provided. In the form shown in Figure 2, the general assembly 85, this consists of an oil chamber 89 in which move paddles carried by a collar 86 keyed to the shaft. The friction of these paddles will produce a sloweddown reverse movement.

A controller has been described which has an initial position, means for moving it forward to a series of new positions, means for releasing it to return at any time, intermediate arresting means dividing the total travel of the controller into sections and permitting a return only to the beginning of the section in which the controller happens to be, and finally there is a master release, effective only at the end of the travel of the controller, that permits the controller to automatically return to its starting point.

While this has been shown as an electrically actuated circular controller closing electric circuits, it is clear that the invention would be equally applicable to a controller wherein cams directly moving the valves controlled by the controller are substituted for the electric circuits that are here shown as the means for closing valves or causing other things to happen. These cams could move in a straight line as well as in the circular path here described.

What I claim is:

1. A circuit closing device having, in combination, a frame, a shaft supported in the frame, a coil spring attached to the frame and shaft tending to rotate the shaft in reverse direction, a shelf carried by the frame having a hole through which the shaft passes, a row of contacts on the shelf, a contact finger carried by the shaft adapted to move over the contacts in succession, a solenoid carried by the frame, a ratchet wheel carried by the shaft, a pawl adapted to engage said ratchet and to be moved by the solenoid to turn shaft forward and to wind up said coil spring, another pawl carried by the housing and engaging the same ratchet wheel to prevent retrograde movement of the shaft, a sliding plate carried by the frame biased to move in one direction, lugs attached to the plate engaging each of the pawls adapted to release them from engagement with the ratchet and to allow the spring to carry the shaft in reverse when moved against its bias, a disc having notches carried by the shaft, a master pawl supported on the frame adapted to be engaged by a notch when the shaft is moved backward by the coil spring, a bent arm riding free on the shaft adapted to hold the master pawl disengaged when pushed under the pawl, a pin carried by the shaft which upon completion of the entire travel of the shaft engages one side of the bent arm to move it into position and to hold the master pawl out of the path of the notches, a notch on the disc adapted to be engaged by the master pawl only after the spring has carried the shaft through substantially a complete revolution allowing the pin to engage the other side of the bent arm and to push it out of engagement with the master pawl.

2. A circuit closing device, comprising, in combination, a frame, electrical contacts arranged in a row on the frame, a movable element carrying a contact arm adapted to cooperate successively with each of said contacts to close a circuit through the contact, means biasing the movable element toward one end of said row of contacts, a ratchet carried by said element, means including a pawl engaging said ratchet to move the element forward step by step against the biasing means, a second pawl carried by the frame and engaging said ratchet adapted to prevent retrograde movement of the element, releasing means adapted to disengage both pawls to allow the biasing means to act, spaced notches on the element, a resetting pawl carried by the frame engaged by one of said notches to limit retrograde motion when both pawls are disengaged, a resetting arm adapted to be pushed by the element under said resetting pawl to hold it disengaged when the element approaches the end of the row of contacts so that upon the next actuation of the pawl-releasing means the biasing means may carry said notches on the element back past the resetting pawl and to return the contact arm to the beginning of the row of contacts.

3. A circuit closing device, comprising, in combination, a frame, electrical contacts arranged in a circular arc on the frame, a movable shaft carrying a contact arm adapted to cooperate successively with each of said contacts to close a circuit through the contact, means biasing the shaft toward one end of said row of contacts, a ratchet carried by said shaft, means including a pawl engaging said ratchet to move the shaft forward step by step against the biasing means, a second pawl carried by the frame and engaging said ratchet adapted to prevent retrograde movement of the shaft, releasing means adapted to disengage both pawls to allow the biasing means to act, a disc on the shaft having spaced notches, a resetting pawl carried by the frame adapted to be engaged by said notches to limit retrograde motion when both pawls are disengaged, a resetting arm adapted to be pushed by the element under said resetting pawl to hold it disengaged when the element approaches the end of the row of contacts so that upon the next actuation of the pawl-releasing means the biasing means may carry the said notches on the disc back past the resetting pawl and to return the contact arm to the beginning of the row of contacts.

4. A circuit making device adapted to close successively a series of electrical circuits having, in combination, a frame, a row of electrical contacts carried by the frame, an element movable in the frame, a contact arm carried by said element adapted to be moved over said row of contacts to close the circuits successively, means attached to the element biasing it to move toward one end of the row of contacts, a ratchet carried by said element, a pawl adapted to engage said ratchet for moving the ratchet and the element against its bias a step, a second pawl engaging said ratchet preventing retrograde movement of the element when moved forward a step, releasing means carried by the frame adapted to disengage both pawls from the ratchet allowing the biasing means to move the element in a retrograde direction, other notches carried by the movable element, a resetting pawl supported on the frame adapted to be engaged by one of said other notches to limit the retrograde motion.

5. A circuit closing device having, in combination, a row of terminals for individual circuits, a movable finger adapted to move over these terminals to successively close the several circuits, means for moving the movable finger step by step from one end of the row in a forward direction to the successive terminals, reversing means adapted to carry said finger backwards toward the beginning of the row without pausing at intermediate contacts, a number of stops associated with said movable finger to limit the reverse movement to intermediate contacts, a pawl successively passed by said stops during the forward movement of the finger adapted to be engaged by the last stop passed upon reverse movement of the finger, mechanism adapted to disable said pawl, means actuated by the finger itself after the finger has traveled forwardly through a substantial portion of its appointed travel to operate said mechanism to disable the pawl to allow the finger upon reverse movement to pass said intermediate contacts and thereupon to again actuate the mechanism to place said pawl into operation, another stop associated with the movable finger engaged by said pawl after the pawl is again made effective to stop the finger at the initial point of its travel.

6. A circuit closing device adapted to engage a series of contacts in succession having means to turn back the device to a particular intermediate contact so that the device may reengage only a part of the series and other means which allow the device to return to the beginning of the series only after the entire series has been contacted having, in combination, a shaft, a row of contacts, a finger attached to the shaft adapted to successively engage the several contacts, means for turning the shaft step by step in a forward direction so that the finger will pause successively at each of the contacts, normally inactive means adapted upon release to turn said shaft backwardly over the contacts without pausing, a stop limiting the extent of the reverse movement of the shaft to permit the finger to return only to some intermediate contact, means to make said stop ineffective engaged by the shaft only after the shaft has carried the finger through engagement with substantially the entire row of contacts to permit the normally inactive means to carry the finger back to the beginning of its path.

7. A controller adapted to govern the performance of the successive steps embraced in each of several operations to be performed in succession on a material which permits the repetition of only the steps of the last operation that has been performed, comprising, in combination, a frame, a plurality of elements carried by the frame, each element adapted to cause one step of one operation to be performed; another plurality of elements carried by the frame, each element adapted to cause one step of a succeeding operation to be performed; a movable member carried by the frame adapted to cause any element it engages to cause the step corresponding to that element to be performed, means for moving said member step by step to successively cause said elements to perform the steps constituting one operation, a stop which prevents reverse movement of the member, said stop becoming effective after all of the elements controlling the steps of one operation have been engaged to prevent repetition of that step.

8. A controller adapted to govern the performance of the successive steps embraced in each of several operations to be performed in succession on a material which permit the repetition of only the steps of the last operation that has been performed, comprising, in combination, a frame, a plurality of contacts carried by the frame, circuits each including one of said contacts, each circuit adapted to cause one step of one operation to be performed, another plurality of contacts carried by the frame, other circuits each including one of said contacts each adapted to cause one circuit to cause one step of a succeeding operation to be performed, a movable member carried by the frame adapted to close the circuit which includes the particular contact it engages to cause the step corresponding to that circuit to be performed, means for moving said member step by step to successively cause said circuits to perform the steps constituting one operation, a stop which prevents reverse movement of the member, said stop becoming effective after all of the contacts controlling one step of one operation have been engaged.

9. A controller adapted to govern the performance of the successive steps embraced in each of several operations to be performed in succession on a material which permits the repetition of only the steps of the last operation that has been performed, comprising, in combination, a frame, a plurality of elements carried by the frame, each element adapted to cause one step of one operation to be performed; another plurality of elements carried by the frame, each element adapted to cause one step of a succeeding operation to be performed; a movable member carried by the frame adapted to cause any element it engages to cause the step corresponding to that element to be performed, means for moving said member step by step to successively cause said elements to perform the steps constituting one operation, a stop which prevents reverse movement of the member, said stop becoming effective after all of the elements controlling the steps of one operation have been engaged to prevent repetition of that step, a device disabling said stop after the member has engaged all of the elements covering all of the operations.

10. A controller adapted to govern the performance of the successive steps embraced in each of several operations to be performed in succession on a material which permit the repetition of only the steps of the last operation that has been performed, comprising, in combination, a frame, a plurality of contacts carried by the frame, circuits each including one of said contacts, each circuit adapted to cause one step of one operation to be performed, another plurality of contacts carried by the frame, other circuits each including one of said contacts each adapted to cause one circuit to cause one step of a succeeding operation to be performed, a movable member carried by the frame adapted to close the circuit which includes the particular contact it engages to cause the step corresponding to that circuit to be performed, means for moving said member step by step to successively cause said circuits to perform the steps constituting one operation, a stop which prevents reverse movement of the member, said stop becoming effective after all of the contacts controlling one step of one operation have been engaged, a device disabling said stop after the member has engaged all of the contacts covering all of the operations.

11. A controller having, in combination, a frame, a rotatable element supported by the frame, a disc having notches carried by the element, a pawl supported on the frame adapted to be successively engaged by notches in said disc in such manner that retrograde motion of said notches past said pawl is prevented, a finger supported on the rotatable element and angularly movable relative thereto which is adapted to move said pawl into an inoperative position, an arm attached to the rotatable element which is adapted to engage said finger causing it to move said pawl to an inoperative position after the rotatable element has moved through a preset angle in order to permit retrograde movement past said pawl.

12. A controller having, in combination, a frame, a rotatable element supported by the frame, a disc having notches carried by the element, a pawl supported on the frame adapted to be successively engaged by notches in said disc in such manner that retrograde motion of said notches past said pawl is prevented, a finger supported on the rotatable element and angularly movable relative thereto which is adapted to move said pawl into an inoperative position, an arm attached to the rotatable element which is adapted to engage said finger causing it to move said pawl to an inoperative position after the rotatable element has moved through a preset angle to permit retrograde movement past said pawl and to again move said finger to allow said pawl to return to an operative position after the rotatable element has moved back through the preset angle to its initial position.

13. A controller having, in combination, a frame, a rotatable element supported by the frame, a disc having notches carried by the element, a ratchet also carried by the element, a pawl supported on the frame adapted to be successively engaged by teeth of the ratchet as the rotatable element turns in a forward direction, a second pawl engaged by notches in said disc in such manner that retrograde motion of said rotatable element upon release of the first named pawl is limited to that required to engage the notches in the disc with the second pawl, a finger supported on the rotatable element and angularly movable relative thereto which is adapted to move said second pawl into an inoperative position, an arm attached to the rotatable element which is adapted to engage said finger causing it to move said second pawl to an inoperative position after the rotatable element has moved through a preset angle thereby permitting retrograde movement past said second pawl.

14. A controller having, in combination, a frame, a rotatable element supported by the frame, a disc having notches carried by the element, a ratchet also carried by the element, a pawl supported on the frame adapted to successively engage teeth of the ratchet as the rotatable element turns in a forward direction, a second pawl engaging notches in said disc in such manner that retrograde motion of said rotatable element upon release of the first named pawl is limited to that required to engage the notches in the disc with the second pawl, a finger supported on the rotatable element and angularly movable relative thereto which is adapted to move said second pawl into an inoperative position, an arm attached to the rotatable element which after the rotatable element has moved through a preset angle is adapted to engage said finger causing the finger to move in the forward direction of rotation and to thereby transfer said second pawl to an inoperative position thereby permitting retrograde movement past said second pawl whereupon, upon return of the arm to the initial position, said arm again engages said finger to move it in reverse direction thereby restoring the second pawl to operative position.

15. A controller having, in combination, a frame, a rotatable element supported by the frame, a disc having notches carried by the element, a ratchet also carried by the element, a spring whose ends are attached to the frame and the element respectively, a pawl supported on the frame adapted to successively engage teeth of the ratchet as the rotatable element turns in a forward direction stressing said spring, a second pawl engaging notches in said disc in such manner that retrograde motion of said rotatable element by said stressed spring upon release of the first named pawl is limited to that required to engage the notches in the disc with the second pawl, a finger supported on the rotatable element and angularly movable relative thereto which is adapted to move said second pawl into an inoperative position, an arm attached to the rotatable element which is adapted to engage said finger causing it to move said second pawl to an inoperative position after the rotatable element has been moved through a preset angle thereby permitting the spring to initiate retrograde movement past said second pawl.

ALBERT H. DE MOSS.

REFERENCES CITED

The following references are of record in the file of this patent:

UNITED STATES PATENTS

| Number | Name | Date |
| --- | --- | --- |
| 748,980 | Norstrom | Jan. 5, 1904 |
| 749,824 | Norstrom | Jan. 19, 1904 |
| 1,150,514 | Gibney | Aug. 17, 1915 |
| 1,176,285 | Gibney | Mar. 21, 1916 |
| 1,275,780 | Spurr | Aug. 13, 1918 |
| 1,495,020 | Hall | May 20, 1924 |
| 1,508,527 | Porter | Sept. 16, 1924 |
| 1,508,528 | Porter | Sept. 16, 1924 |
| 2,281,262 | Breitenstein | Apr. 28, 1942 |